United States Patent
Gajek

(10) Patent No.: US 10,630,472 B2
(45) Date of Patent: Apr. 21, 2020

(54) METHOD AND SYSTEM FOR PROVIDING ENCRYPTED DATA ON A CLIENT

(71) Applicant: NEC Europe Ltd., Heidelberg (DE)

(72) Inventor: Sebastian Gajek, Flensburg (DE)

(73) Assignee: NEC CORPORATION, Tokyo (JP)

(*) Notice: Subject to any disclaimer, the term of this patent is extended or adjusted under 35 U.S.C. 154(b) by 248 days.

(21) Appl. No.: 15/570,172

(22) PCT Filed: Apr. 29, 2015

(86) PCT No.: PCT/EP2015/059376
§ 371 (c)(1),
(2) Date: Oct. 27, 2017

(87) PCT Pub. No.: WO2016/173646
PCT Pub. Date: Nov. 3, 2016

(65) Prior Publication Data
US 2018/0131512 A1    May 10, 2018

(51) Int. Cl.
*H04L 9/00* (2006.01)
*H04L 9/08* (2006.01)
(Continued)

(52) U.S. Cl.
CPC .......... *H04L 9/0866* (2013.01); *G06F 21/602* (2013.01); *H04L 9/008* (2013.01); *H04L 9/3073* (2013.01)

(58) Field of Classification Search
CPC .................. H04L 2209/46; H04L 9/008
See application file for complete search history.

(56) References Cited

U.S. PATENT DOCUMENTS

| | | | | |
|---|---|---|---|---|
| 2010/0046741 | A1* | 2/2010 | Isogai | H04L 9/3013 380/28 |
| 2013/0275752 | A1* | 10/2013 | Zhang | H04L 9/008 713/167 |
| 2014/0321644 | A1* | 10/2014 | Lemieux | H04L 9/008 380/46 |

OTHER PUBLICATIONS

Boneh et al., "Fully Key-Homomorphic Encryption, Arithmetic Circuit ABE, and Compact Garbled Circuits", *International Association for Cryptologic Research*, Jun. 3, 2014(185537):, 1-41 (May 20, 2014).
(Continued)

*Primary Examiner* — Olugbenga O Idowu
(74) *Attorney, Agent, or Firm* — Leydig, Voit & Mayer, Ltd.

(57) ABSTRACT

The present invention relates to a method for providing encrypted data on a client, a cloud or the like, performed in a memory available to a computation device comprising the steps of a) Providing for each user a user specific encryption key for encrypting user-specific plaintext, b) Computing a common decryption key with a pre-determined function using the user specific encryption keys as input for said function, and wherein the common decryption key is computed based on at least two product groups of the same prime order, c) Encrypting each user-specific plaintext with the corresponding user-specific encryption key resulting in user-specific ciphertexts, d) Computing a common ciphertext with said function using the user-specific ciphertexts as input for said function, e) Providing the common ciphertext and the common decryption key for decryption, preferably to a user, wherein step c) is performed such that encryption is homomorphic in the user-specific plaintext as well in the user-specific encryption keys, wherein said function is a polysized function supporting poly-many additions and a single multiplication.

20 Claims, 4 Drawing Sheets

Figure 1:
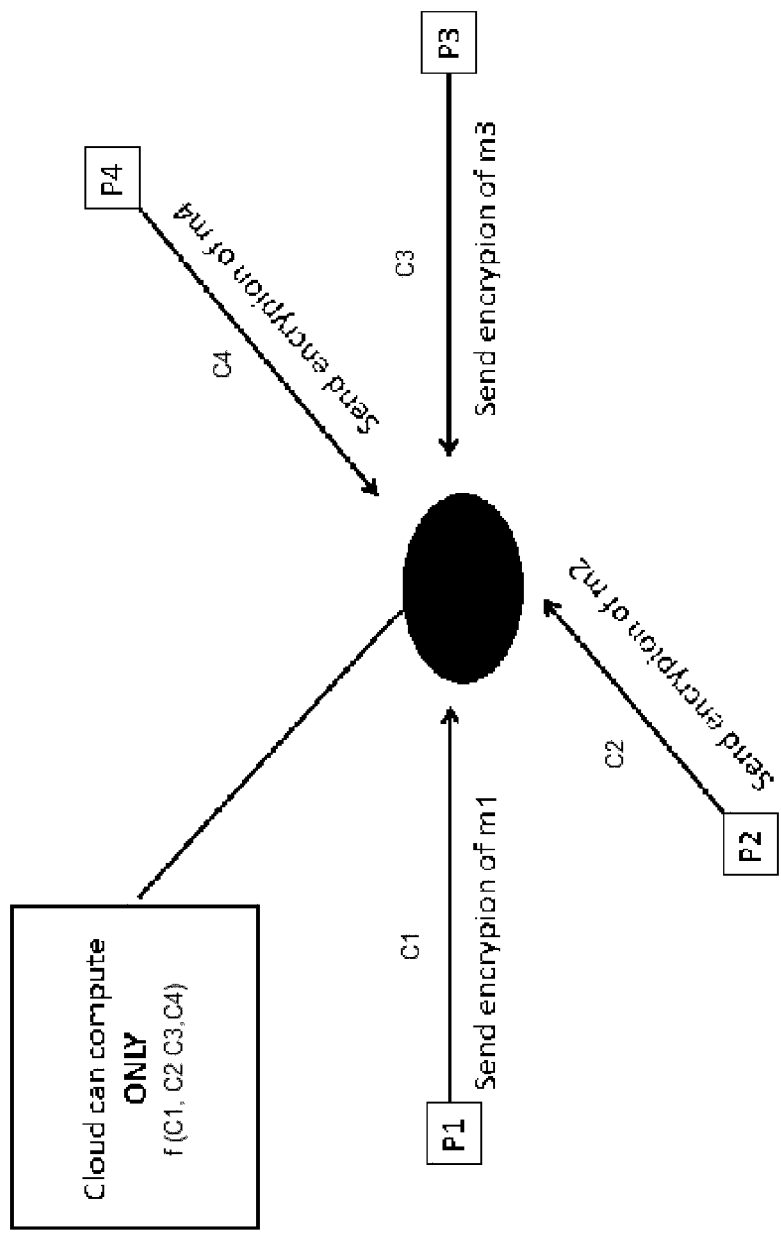

(51) Int. Cl.
*H04L 9/30* (2006.01)
*G06F 21/60* (2013.01)

(56) References Cited

OTHER PUBLICATIONS

Lopez-Alt et al.,: "On-the-Fly Multiparty Computation on the Cloud via Multikey Fully Homomorphic Encryption", *International Association for Cryptologic Research*, Feb. 21, 2013(153834): 1-44 (Feb. 21, 2013).
Wang et al., "A Tale of Two Clouds: Computing on Data Encrypted Under Multiple Keys", *2014 IEEE Conference on Communications and Network Security*, 337-345 (Oct. 29, 2014).
European Patent Office, International Search Report and the Written Opinion in International Application No. PCT/EP2015/059376 (dated Jan. 20, 2016).

* cited by examiner

METHOD AND SYSTEM FOR PROVIDING ENCRYPTED DATA ON A CLIENT

CROSS-REFERENCE TO RELATED APPLICATIONS

This application is a U.S. National Phase application under 35 U.S.C. § 371 of International Application No. PCT/EP2015/059376, filed on Apr. 29, 2015. The International Application was published in English on Nov. 3, 2016, as WO 2016/173646 A1 under PCT Article 21(2).

The PCT-application PCT/EP2015/050432 is herein incorporated by reference.

The present invention relates to a method for providing encrypted data on a client, a cloud or the like performed in a memory available to a computation device.

The present invention further relates to a system for providing encrypted data.

Although applicable to any kind of encryption system, the present invention will be described with regard to an encryption system located in a cloud.

Cloud storage and services enable a user to offload storage of their data and associated computations on that data. Therefore companies and enterprises may avoid an expensive data center of their own and rely instead on cloud storage and corresponding computational services. However, data in the "cloud" raises serious privacy concerns, since the data in the cloud is for example accessible by the cloud provider itself. The enterprises have therefore to rely on the trustworthiness of the cloud provider and its security measures to avoid any misuse of the data.

Many cloud storage users employ in consequence encryption on user data to preserve the data privacy. One of the problems is however, that computation on encrypted data is very difficult to be efficiently performed without decrypting the encrypted data.

In US 2013/0097417 A1 a so-called somewhat homomorphic encryption scheme is provided. Collected data is encrypted using the somewhat homomorphic encryption based on a data provider's private key. Afterwards the encrypted data is stored in a network-accessible storage. Then computations are performed on the encrypted data and the encrypted results from the computation are communicated to the data provider. The data provider decrypts the results using the data provider's private key. These somewhat homomorphic encryption schemes or l-leveled homomorphic encryption schemes are restricted in the number of ciphertext multiplication compositions or gates, i.e. the upper bound I for the number of multiplication gates is fixed in advance.

In contrast thereto fully-homomorphic encryption schemes—FHE—are encryption schemes supporting the homomorphic evaluation of any polysized function, which is described as an arithmetic circuit over poly-many additions and poly-many multiplication gates over encrypted data. However, fully-homomorphic evaluation is nowadays still a theoretic concept despite significant progress made recently.

Therefore, somewhat homomorphic encryption schemes are at present the schemes which can be practically used. Such partially homomorphic encryption systems are for example the El Gamal crypto system, the Paillier and the Goldwasser-Micali encryption system. These schemes are somewhat homomorphic in message plaintext.

In the non-patent literature of Craig Gentry and Shai Halevi "Implementing gentry's fully-homomorphic encryption scheme", Cryptology ePrint Archive, Report 2010/520, 2010, http://eprint.iacr.org/ shows an encryption scheme which is fully-homomophic in the message plaintext. Variants of these encryption schemes being fully-homomophic in the message plaintext are for example disclosed in US 2013/8565435 B2 or in US 2013/00170640 A1. Other variants which are based on the same mathematical structure, i.e. a lattice structure, are for example disclosed in the non-patent literature of Adriana Lopez-Alt, Eran Tromer and Vinod Vaikuntanathan "On-the-fly multiparty computation on the cloud via multikey fully homomorphic encryption", Cryptology ePrint Archive, Report 2013/094, 2013, http://eprint.iacr.org/ which are additive homomorphic in the encryption key and fully-homomorphic in the message plaintext.

Another variant of the encryption scheme based on the mathematical structure lattice, is for example disclosed in the non-patent literature of Dan Boneh, Craig Gentry, Sergey Gorbunov, Shai Halevi, Valeria Nikolaenko, Gil Segev, Vinod Vaikuntanathan and Dhinakaran Vinayagamurthy "Fully key-homomorphic encryption, arithmetic circuit abe, and compact garbled circuits", Cryptology ePrint Archive, Report 2014/356, 2014, http://eprint.iacr.org/, which have been shown to be fully-homomorphic in the encryption key but not in the message plaintext. These lattice-based constructions require much randomness sampled from the Gaussian distribution. Sampling randomness in particular from the Gaussian distribution cannot be effectively computed on low-level devices. Moreover the key and ciphertext sizes are very long, typically by a factor of 400 of the field size.

When these fully homomorphic encryption schemes are performed on the cloud, there are several problems arising: In some applications, for example one wishes to realize a supply chain where the cloud decrypts the outcome of the evaluation or a fraction thereof. One wants to make sure that the cloud learns no information about the input of the parties. The aforementioned fully homomorphic encryption schemes are useless here, because by definition there exists a single decryption key only. However, a cloud in possession of the decryption key will not only decrypt the evaluated ciphertext but may also decrypt the encrypted inputs of the parties and therefore a great security problem arises.

Another problem is that in many applications some verification mechanism has to be added to ensure a correct computation of the function, otherwise the parties do not have any guarantee of a correct evaluation. When using the aforementioned fully-homomorphic encryption schemes there is no guarantee that the cloud indeed computed the expected function. For this reason computationally expensive proofs of computation to verify the correct computation of the function are usually added.

It is therefore an objective to provide a method and a system for providing encrypted data which can be easily and efficiently implemented while being fast.

It is a further objective to provide a method and a system for providing encrypted data using short ciphertext sizes.

It is an even further objective to provide a method and system for providing encrypted data with which an easy verification for the proof of computation is enabled.

In at least one embodiment a method for providing encrypted data on a client, a cloud or the like, performed in a memory available to a computation device, is defined comprising the steps of a) Providing for each user a user specific encryption key for encrypting user-specific plaintext, b) Computing a common decryption key with a pre-determined function using the user specific encryption keys as input for said function, and wherein the common decryption key is computed based on at least two product groups of the same prime order, c) Encrypting each user-specific plaintext with the corresponding user-specific encryption key resulting in user-specific ciphertexts, d) Computing a common ciphertext with said function using the user-specific ciphertexts as input for said function, e) Providing the common ciphertext and the common decryption key for decryption, wherein step c) is performed such that encryption is homomorphic in the user-specific plaintext as well in the user-specific encryption keys and wherein said function is a polysized function supporting poly-many additions and a single multiplication.

In at least one embodiment a system for providing encrypted data is defined comprising one or more computation devices comprising User key provision means adapted to provide for each user a user specific encryption key for encryption of user-specific plaintext, Decryption key generation means adapted to compute a common decryption key with a pre-determined function using the user specific encryption keys as input for said function, and wherein the common decryption key is computed based on at least two product groups of the same prime order, Encryption means adapted to encrypt each user-specific plaintext with the corresponding user-specific encryption key resulting in user-specific ciphertexts, Ciphertext means adapted to compute a common ciphertext with said function using the user-specific ciphertexts as input for said function, wherein the encryption by the encryption means is performed such that encryption is homomorphic in the user-specific plaintext as well in the user-specific encryption keys and wherein said function is a polysized function supporting poly-many additions and a single multiplication is defined.

At least one embodiment herein is homomorphic in the encryption key and in the message plaintext.

At least one embodiment herein enables an evaluation of level-1 circuits/functions supporting a single multiplication in poly-many additions. At least one embodiment enables the evaluation of Boolean circuits, i.e. formulas comprising "and" and "or" operations.

At least one embodiment herein enables sizes of ciphertext which are short compared to conventional methods and systems.

At least one embodiment provides the advantage of being very efficient and being easily to implement.

At least one embodiment enables the use of type-3 groups, i.e, groups pf prime order with an asymmetric pairing.

The term "homomorphic in the message plaintext" is to be understood in particular in the following way: If for any public key k and messages $(m_1, m_2)$ it holds that $Enc(k, m_1) \cdot Enc(k, m_2) = Enc(k, m_1 \cdot m_2)$, where the operator "·" is a operand allowing to "add" or "multiply" the message plaintext and Enc( ) is an encryption procedure or routine.

The term "homomorphic in the key" or "homomorphic in the encryption key" or similar expressions are to be understood in the following way: A public-key encryption scheme is deemed homomorphic in the encryption key, if in addition for any pair of encryption keys $(k_1, k_2)$ and message plaintexts $(m_1, m_2)$ it holds that $Enc(k_1, m_2) \cdot Enc(k_2, m_2) = Enc(k_1 \cdot k_2, m_1 \cdot m_2)$.

The term "compact" in connection with encryption key or ciphertext means that the ciphertext (resp. encryption key) size after the homomorphic evaluation of ciphertexts (resp. encryption keys) does not increase as a function of the circuit.

User key provisions means include, but are not limited to, an application adapted to provide for each user a user specific encryption key for encryption of user-specific plaintext running in a memory available to a computer, a microprocessor, a single, dual, quad or octa-core processor or processors or the like or a processor, or the like with a memory. Said application or processor may have one or more interfaces, ports or the like for communication with other devices, entities, ports, interfaces or the like.

Decryption key generation means include, but are not limited to, an application adapted to compute a common decryption key with a pre-determined function using the user specific encryption keys as input for said function running in a memory available to a computer, a microprocessor, a single, dual, quad or octa-core processor or processors or the like or a processor, or the like with a memory. Said application or processor may have one or more interfaces, ports or the like for communication with other devices, entities, ports, interfaces or the like.

Encryption means include, but are not limited to, an application adapted to encrypt each user-specific plaintext with the corresponding user-specific encryption key running in a memory available to a computer, a microprocessor, a single, dual, quad or octa-core processor or processors or the like or a processor, or the like with a memory. Said application or processor may have one or more interfaces, ports or the like for communication with other devices, entities, ports, interfaces or the like.

Ciphertext means include, but are not limited to, an application adapted to compute a common ciphertext with said function using the user-specific ciphertexts as input for said function running in a memory available to a computer, a microprocessor, a single, dual, quad or octa-core processor or processors or the like or a processor, or the like with a memory. Said application or processor may have one or more interfaces, ports or the like for communication with other devices, entities, ports, interfaces or the like.

Further features, advantages and further embodiments are described or may become apparent in the following.

A user may apply at the common decryption key to decrypt the common ciphertext. This may enable a user to perform decryption of the common ciphertext.

If a key other than the common decryption key for decrypting the common ciphertext is used a random value may be provided as decryption result. When applying the "right" decryption key for the common ciphertext evaluated under the function, then the correctness of the performed steps guarantees that the user will decrypt $f(m_1, \ldots, m_2) \leftarrow DEC(K, C)$. On the other hand security is safeguarded such that a curious or malicious party holding a key other than the common decryption key will decrypt a random value with overwhelming probability. For instance when applying the "right" encoding to a user-specific plaintext, e.g. by encoding the first half with "1"'s, each user can verify the correct computation of the function in question. An evaluation of the function other than said function decrypts to a message which is uniformly distributed. Even when a group of n−1 malicious or corrupted users combine their user-specific encryption keys these users are not able to decrypt the common ciphertext as long as a single user is honest or uncorrupted respectively.

A master secret key may be computed and may be used together with said function and the user-specific encryption keys to compute said common decryption key prior to computing the common decryption key. A master secret key may enable in an easy way to provide the further common decryption key, for example based on the function and the corresponding user-specific encryption keys.

The master secret key may comprise random seed information associated with identification information via a pseudo-random function defining elements in different user-specific ciphertexts. This may enable a reduction of the size of the master secret key, for example by deriving tags through a pseudorandom function. Thus, storage space is saved.

When a user-specific encryption key is evaluated under said function the resulting evaluated user-specific encryption key may be compact in size. This may enable that any homomorphic key evaluation of the level-one circuit results in constant key sizes of two group elements.

When the user-specific ciphertext is evaluated under said function, the resulting evaluated user-specific ciphertext may be compact in size. This may enable that any homomorphic ciphertext evaluation of the level-1 circuit results in constant ciphertext sizes of two group elements.

Said function may be provided out of the set of polysized affine functions. This may enable an efficient computation of the function when being selected as a polysized affine function.

When computing the common decryption key an input vector comprising the user-specific encryption keys may be divided into two parts, each part having the same length and indicating different user-specific ciphertext. This may enable a fast and efficient computation of the common decryption key.

Said resulting user-specific encryption key may be constant. This may enable the evaluation of said keys independent of said function f.

Said resulting evaluated user-specific ciphertext may be constant. This may enable the evaluation of said keys independent of said function f.

Said master secret key may be computed based on said elements of said at least two product groups of said same prime order. This may enable to derive from the master secret key the decryption key based on said two product groups.

The user-specific ciphertext encrypted under a user-specific encryption key may be based on four parts, wherein the first and last part may be each computed based on a product of different generators of one of said groups, wherein one said generator may be computed based on the user-specific plaintext. This may enable to compute the user-specific ciphertext efficiently while being secure.

The two middle parts of said four parts may be using products of generators, wherein said generators are computed based on the user-specific plaintext and different random information. This may enable to compute the user-specific ciphertext even more efficiently while being secure.

Figure 2:
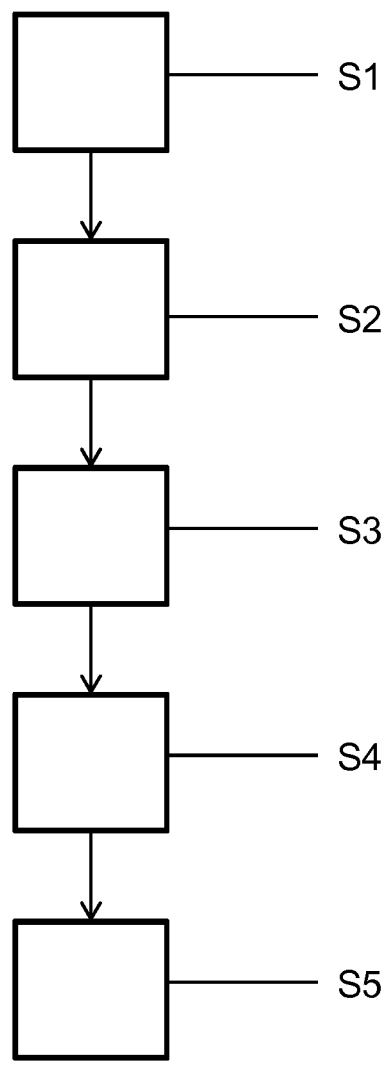
Figure 3:
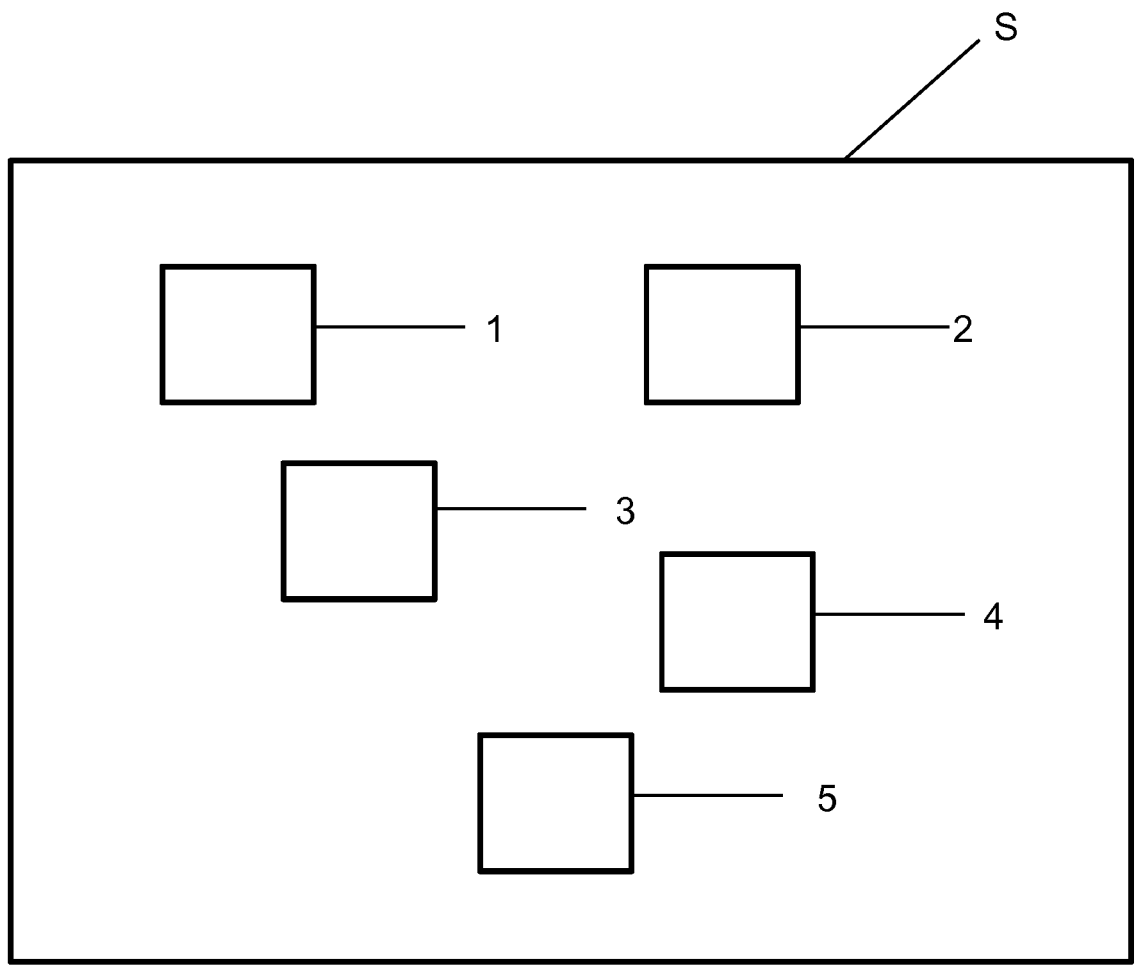
Figure 4:
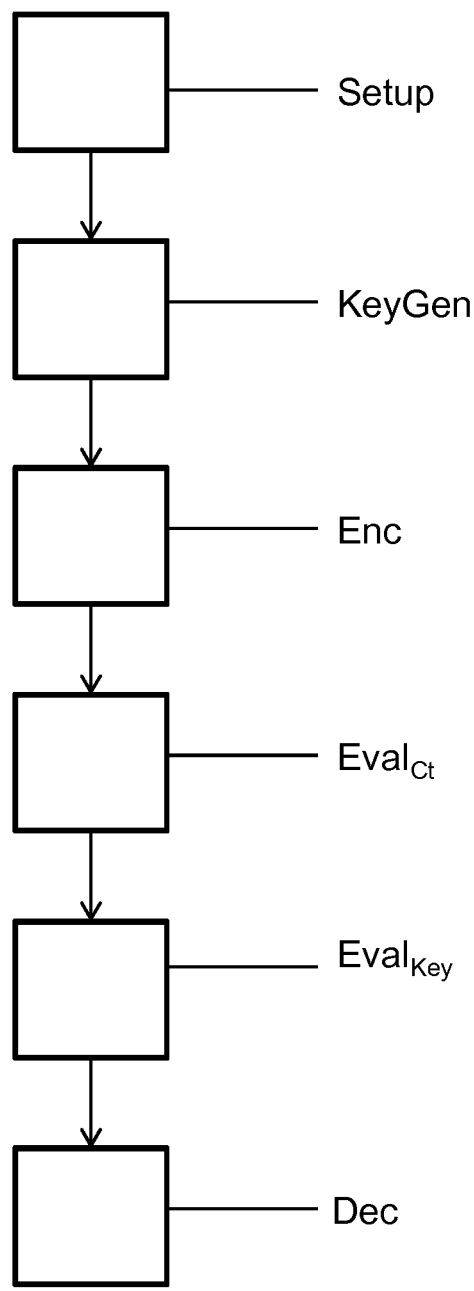

There are several ways how to design and further develop the teaching of the embodiments in an advantageous way. To this end it is to be referred to the patent claims on the one hand and to the above mentioned and following explanation of embodiments by way of example, illustrated by the figure on the other hand. In connection with the explanation of embodiments by the aid of the figure, generally embodiments and further developments of the teaching will be explained. In the drawings FIG. 1 shows a part of a method according to an embodiment;
FIG. 2 shows steps of a method according to an embodiment;
FIG. 3 shows a system according to an embodiment; and
FIG. 4 shows a method according to an embodiment.
FIG. 1 shows a part of a method according to an embodiment.

In FIG. 1 an example scenario for a method according to an embodiment is shown. Different users P1, P2, P3, P4 each use their own user-specific encryption key $k_1, k_2, k_3, k_4$, to encrypt the user-specific plaintext $m_1, m_2, m_3, m_4$. Each user P1, P2, P3, P4 sends the encryption of its user-specific plaintext $m_1, m_2, m_3, m_4$, i.e. the corresponding ciphertext C1, C2, C3, C4 to the cloud, so that the cloud receives the encryptions of the messages $m_1, m_2, m_3, m_4$ encrypted under the corresponding keys $k_1, k_2, k_3, k_4$. The cloud evaluates then not only the encrypted function f but also may decrypt the output f (C1, C2, C3, C4) provided if it is in possession of the specific key, i.e. the common decryption key $K=f(k_1, \ldots, k_n)$. This common decryption key K is useless for other operations than the decryption of the output f (C1, C2, C3, C4). Vice versa other keys other than $f(k_1, \ldots, k_n)$ are useless of the decryption of f (C1, C2, C3, C4). The number of users P1, P2, P3, P4 may be arbitrarily large and bounded by a polynomial in a security parameter, wherein the security parameter is e.g. used as shown in FIG. 4 in the Setup procedure.

FIG. 2 shows steps of a method according to an embodiment.

In FIG. 2 steps of a method according to an embodiment are shown.

In a first step S1 for each user a user-specific encryption key for encrypting user-specific plaintext is provided.

In a second step S2 a common decryption key is computed with a pre-determined function using the user-specific encryption keys as input for said function, and wherein the common decryption key is computed based on elements of at least two product groups of the same prime order.

In a third step S3 each user-specific plaintext is encrypted with a corresponding user-specific encryption key resulting in user-specific ciphertexts.

In a fourth step S4 a common ciphertext is computed with said function using the user-specific ciphertexts as input for said function and in a fifth step S5 the common ciphertext is provided and the common decryption key for decryption.

The third step S3 is performed such that the encryption is homomorphic in the user-specific plaintext as well as in the user-specific encryption keys and said function is a poly-sized function supporting poly-many additions and a single multiplication.

FIG. 3 shows a system according to an embodiment.

In FIG. 3 the system S comprises user key provision means 1 adapted to provide for each user a user-specific encryption key for encryption of user-specific plaintext.

The system S further comprises decryption key generation means 2 adapted to compute common encryption key with a pre-determined function using the user-specific encryption keys as input for said function, and wherein the common decryption key is computed based on elements of at least two product groups of the same prime order.

The system S further comprises encryption means 3 adapted to encrypt each user specific plaintext with the corresponding user-specific and encryption key resulting in user-specific ciphertexts.

The system S even further comprises ciphertext means 4 adapted to compute a common ciphertext with said function using the user-specific ciphertexts as input for said function and decryption means 5 may be provided and adapted to provide the common ciphertext and the common decryption key for decryption. The encryption by the encryption means 3 is performed such that the encryption is homomorphic in the user-specific plaintext as well as in the user-specific encryption key and wherein said function is a polysized function supporting poly-many additions and a single multiplication.

FIG. 4 shows a method according to an embodiment.

In FIG. 4 steps of a construction of a level-1 key in message homomorphic symmetric encryption system with short ciphertexts are shown.

In a first step a setup-procedure Setup(•) is performed:

Setup($1^\lambda$): On input the security parameter $1^\lambda$ (p, $G_1$, $G_2$, $G_T$, e)←GG($1^\lambda$) is computed and random generators $g_1$, $g_2$←$_R G_1$ and $h_1$, $h_2$←$_R G_2$ are chosen.

Further at random x, y←$_R \mathbb{Z}_p$ is chosen. The message space is e.g. set to X={0, 100} and the tag space to T=$\mathbb{Z}_p$. It is assumed that every index k=(i, j)∈K is associated with a random tag $t_{i,j}$∈T, whose purpose is to identify the $i^{th}$ sequence of n ciphertexts, where j denotes the $j^{th}$ element. n is supposed to be even such that I=ceil(n/2), wherein ceil(•) is the ceiling function giving the smallest integer greater than or equal to the input value.

The procedure outputs the master key pair $$MSK=x,y,T \text{ and } PP=X,K,p,g_1,g_2,h_1,h_2,g^x{}_1,g^y{}_2,h^{-y}{}_1,h^{-x_2}$$

The size of the master secret key can be reduced by deriving the tags through a pseudorandom function.

In a second step a key generation procedure KeyGen(•) is performed:

KeyGen (MSK, f, k=($k_1$, $k_n$)): The first half of k is denoted as the tuple ((l, 1), . . . , (l, 1)) and the second half as ((r, 1), . . . , (r, 1)). The following secret key $SK_{f, k}$ is returned:

$$e(g_2,h_2)^{(y-x)\sum_{j=1}^{I}(t_{l,j}\cdot t_{r,j})}$$

If f is the unary identity function for a $key_{i,j}$∈K associated with tag t∈T, the tuple $SK_{k,j}=(g_2{}^t, h_2{}^{-tx}, h_2{}^{ty})$ is returned.

In a third step an encryption procedure Enc(•) for the message plaintext is performed:

Enc ($SK_{ki,j}$, m): To encrypt a message m∈X under $key_{i,j}$ associated with the one-time tag t∈T, the ciphertext $CT_{i,j}$ is set as $$A=g_1{}^m \cdot g_2{}^t, \; B=g_1{}^{xm} \cdot g_2{}^{yt}, \; C=h_1{}^{-ym} \cdot h_2{}^{-xt}, \; D=h_1{}^m \cdot h_2{}^t$$

In a forth step an evaluation $Eval_{Ct}$ of the ciphertext is performed:

$Eval_{Ct}$(f, $CT_{i,1}$, . . . , $CT_{i,n}$): To evaluate the function f on a tuple of n ciphertexts ($CT_{i,1}$, . . . , $CT_{i,n}$), the left half is denoted as ($CT_{l,1}$, . . . , $CT_{l,I}$) and the right half is denoted as ($CT_{r,1}$, . . . , $CT_{r,I}$). The procedure parses from every ciphertext pair ($CT_{l,j}$, $CT_{r,j}$) the tuple ($A_{l,j}$, $B_{l,j}$, $C_{l,j}$, $D_{l,j}$, $A_{r,j}$, $B_{r,j}$, $C_{r,j}$, $D_{r,j}$) and computes the addition and multiplication operations as follows:

Multiplication: The procedure computes the component-wise bilinear map $$e(A_{l,j},C_{r,j}) \cdot e(B_{l,j},D_{r,j})$$

$$=e(g_1{}^{m_{l,j}} \cdot g_2{}^{t_{l,j}}, h_1{}^{-y\cdot m_{r,j}} \cdot h_2{}^{-x \cdot t_{r,j}}) \cdot e(g_1{}^{-x \cdot m_{l,j}} \cdot g_2{}^{y \cdot t_{l,j}}, h_1{}^{m_{r,j}} \cdot h_2{}^{t_{r,j}})$$

$$e(g_1,h_1)^{(x-y) \cdot m_{l,j} \cdot m_{r,j}} \cdot e(g_2,h_2)^{(y-x) \cdot t_{l,j} \cdot t_{r,j}}$$

$$=A^*$$

and returns the ciphertext C T=$A^*$.

Addition in $G_T$ (after Multiplication): The procedure computes the component-wise product $$A_{1*} \cdot A_{2*}$$

$$=e(g_1,h_1)^{(x-y) \cdot m_1} \cdot e(g_2,h_2)^{(y-x) \cdot t_1} \cdot e(g_1,h_1)^{(x-y) \cdot m_2} \cdot e(g_2,h_2)^{(y-x) \cdot t_2}$$

$$=e(g_1,h_1)^{(x-y) \cdot m_1 \cdot m_2} \cdot e(g_2,h_2)^{(y-x) \cdot t_1 \cdot t_2}$$

$$A^+$$

and returns the ciphertext CT=$A^+$.

Addition in $G_1{}^2 \times G_2{}^2$ (before multiplication): The procedure one more time computes then component-wise product $$A_{l,j} \cdot A_{r,j}, B_{l,j} \cdot B_{r,j}, C_{l,j} \cdot C_{r,j}, D_{l,j} \cdot D_{r,j}$$

$$=g_1{}^{m_{l,j}} \cdot g_2{}^{t_{l,j}} \cdot g_1{}^{m_{r,j}} \cdot g_2{}^{t_{r,j}} \cdot g_1{}^{x \cdot m_{l,j}} \cdot g_2{}^{y \cdot t_{l,j}} \cdot g_1{}^{x \cdot m_{r,j}} \cdot g_2{}^{t_{r,j}}$$

$$=g_1{}^{m_{l,j}+m_{r,j}} \cdot g_2{}^{t_{l,j}+t_{r,j}} \cdot g_1{}^{x \cdot (m_{l,j}+m_{r,j})} \cdot g_2{}^{y \cdot (t_{l,j}+t_{r,j})} \cdot g_1{}^{-y \cdot (m_{l,j}+m_{r,j})} \cdot h_2{}^{-x \cdot (t_{l,j}+t_{r,j})}, h_1{}^{m_{l,j}+m_{r,j}} \cdot h_2{}^{t_{l,j}+t_{r,j}}$$

$$=A^{++},B^{++},C^{++},D^{++}$$

and returns the ciphertext CT=($A^{++}$, $B^{++}$, $C^{++}$, $D^{++}$).

In a fifth step an evaluation procedure EvalKey of the encryption keys is performed:

EvalKey(f, $SK_{ki,1}$, . . . $SK_{ki,n}$): To evaluate the function f on a tuple of n keys ($SK_{ki,1}$, . . . $SK_{ki,n}$), the left half is e.g. denoted as ($SK_{kl,1}$, . . . , $SK_{kl,I}$) and the right half as ($SK_{kr, 1}$, . . . , $SK_{kr,I}$). The procedure parses every key pair ($SK_{kl,j}$, $SK_{kr,j}$) as ($A_{l,j}$, $B_{l,j}$, $C_{l,j}$, $A_{r,j}$, $B_{r,j}$, $C_{r,j}$)∈$(G_1 \times G_2)^2$ and computes the addition and multiplication operation as follows:

Multiplication Gate: The procedure computes $$e(A_{l,j},B_{l,j}) \cdot e(A_{r,j},B_{l,j})$$

$$e(g_2,h_2)^{-x \cdot t_{l,j} \cdot t_{r,j}} \cdot e(g_2,h_2)^{y \cdot t_{l,j} \cdot t_{r,j}}$$

$$=A$$

and returns the key SK=A.

Addition (after multiplication): Multiplication of every element in $G_{g_T}$.

Addition (before multiplication): Multiplication of every element $G_1 \times G_2{}^2$.

In a sixth step a decryption procedure Dec may be performed:

Dec(SK, CT): To decrypt a ciphertext CT with secret key SK, two cases are distinguished:

Before multiplication: If CT=($CT_1$, $CT_2$, $CT_3$, $CT_4$)∈$G_1{}^2 \times G_2{}^2$, then $$CT_1/SK_1$$

is computed, where SK=($SK_1$, $SK_2$, $SK_3$)∈$G_1 \times G_2{}^2$.

After multiplication: If C T∈$G_T$, then $$CT/SK$$

is computed where SK∈$G_T$.

0 is returned if the output equals $e(g_1, h_1)^0=1$, and otherwise the discrete log to the base $e(g_1, h_1)^{x-y}$ is computed.

Inter alia for the above mentioned steps the background is the following:

Assuming that $G_1$, $G_2$, and $G_T$ are three multiplicatively written groups of prime order p. Moreover, $g_1$ and $g_2$ are assumed to be generators of $G_1$, and $G_2$ resp., such that $(g_1)=G_1$ and $(g_2)=G_2$. Further assuming e: $G_1 \times G_2 \rightarrow G_T$ is a bilinear map with the following properties:

Bilinearity: For $u \in G_1$, $v \in G_2$, $a, b \in Z_p$, $e(u^a, v^b) = e(u, v)^{ab}$.

Non-Degenracy: $e(g_1, g_2) \neq 1$.

Symmetry: For $u, v \in G$, $a, b \in \mathbb{Z}_p$, $e(u^a, v^b) = e(u^b, v^a)$.

G is a bilinear group if all group operations and the bilinear map are efficiently computable.

In summary at least one embodiment uses product groups and pairing composition to emulate an orthogonality: In detail product groups $G_1 = (g_1, g_1^x) \in G_1$, $G_2 = (g_2, g_2^y) \in G_1$, $H_1 = (h_1^{-y}, h_1) \in G_2$ and $H_2(h_2^{-x}, h_2) \in G_2$ are used.

It can be verified that $G = (G_1, G_2)$ and $H = (H_1, H_2)$ form an orthogonal bases.

At least one embodiment may enable at least one of the following advantages:

It is both homomorphic in key and message plaintext.

It supports the evaluation of level-1 circuits supporting a single multiplication and poly-many additions, also known as inner products. This circuit already allows the evaluation of Boolean circuits.

It is efficient. The construction works over type-3 groups G of prime order p. Thus, the scheme can be efficiently implemented over elliptic curves.

It has compact ciphertexts. Any multiplicative ciphertext evaluation of the level-1 circuit results a single ciphertext of one group element in $G_T$ (where $G_T$ is the target group of the pairing).

It has compact keys. Any homomorphic key evaluation of the level-1 circuit results in a decryption key of a single group element in $G_T$.

Inter alia at least one embodiment may have one of the further advantages apart from being both homomorphic in key and message:

1. It can be efficiently implemented in type-3 groups (on elliptic curves) of prime order enabling a fast implementation.
2. Key and ciphertext sizes are constant. They are independent of the evaluation function f.
3. It requires less randomness. Moreover, it suffices to sample from the uniform distribution for which efficient implementations exists.

In the following examples for applications of embodiments of the present invention are shown. Of course the embodiments are not limited to this list:

1 Searchable Encryption: Supposing a file tagged with a vector y should be searched. Assuming a vector x satisfies the search query, if the inner product <xy>=0. The database should do the orthogonality check while learning neither the (encrypted) search query x nor the (encrypted) database y.
2. Smart Metering: Supposing that every household i has a secret key $SK_i$, and the center receives encrypted metering data from each household. The center should compute a function, say the average consumption, without learning each household's value.
3. Machine Learning. Many machine learning algorithms and procedures require the computation of linear functions, (e.g. average, variance, distance.) Embodiments described herein can realize the computation in a private way.
4. Image processing. Many image processing algorithms and procedures require the compution of affine transformation over matrix groups (e.g. FFT, wavelets, etc.). Embodiments described herein can realize the computation in a private way.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing encrypted data on a client, a cloud or the like, performed in a memory available to a computation device, wherein each of a plurality of users has been provided a respective user-specific encryption key for encrypting respective user-specific plaintext, into respective user-specific ciphertext, the method comprising:
   storing a common decryption key that has been computed with a pre-determined function using the user-specific encryption keys as inputs for the function, and wherein the common decryption key having been computed based on at least two product groups of the same prime order,
   receiving the user-specific ciphertexts,
   computing a common ciphertext with the function using the user-specific ciphertexts as inputs for the function, wherein the common decryption key is usable to decrypt the common ciphertext, and
   providing both the common ciphertext and the common decryption key to one of the users and/or decrypting the common ciphertext with the common decryption key;
   wherein the user-specific ciphertexts are generated such that encryption is homomorphic in the user-specific plaintext as well as in the user-specific encryption keys, and
   wherein the function is a polysized function supporting poly-many additions and a single multiplication.

2. The method according to claim 1, wherein one of the users applies the common decryption key to decrypt the common ciphertext.

3. The method according to claim 1, wherein, if a key other than the common decryption key for decrypting the common ciphertext is used, a random value is provided as decryption result.

4. The method according to claim 1, wherein prior to computing the common decryption key a master secret key is computed, wherein the common decryption key is based on the master secret key in addition to the user-specific encryption keys.

5. The method according to claim 4, wherein the master secret key comprises random seed information associated with identification information via a pseudorandom function defining elements in different of the user-specific ciphertexts.

6. The method according to claim 1, further comprising:
   computing a master secret key based on each of the user-specific ciphertexts, and
   computing the common decryption key such that the master secret key, in addition to the user-specific encryption keys, serves as an input to the function.

7. The method according to claim 1, wherein the common ciphertext is computed such that any key capable of decrypting the common ciphertext must be a function of each of the user-specific encryption keys that were used to generate the user-specific ciphertext upon which the common ciphertext is based.

8. The method according to claim 1, wherein the function comprises a polysized affine functions.

9. The method according to claim 1, wherein when computing the common decryption key an input vector comprising the user-specific encryption keys is divided into two parts, each part having the same length and indicating different of the user-specific ciphertexts.

10. The method according to claim 1, wherein each of the user-specific encryption keys and each of the user-specific ciphertexts have the same size.

11. The method according to claim 7, wherein said resulting evaluated user-specific ciphertext is constant.

12. The method according to claim 4, wherein the master secret key is computed based on elements of the at least two product groups of the same prime order.

13. The method according to claim 1, wherein the user-specific ciphertext encrypted under at least one of the user-specific encryption keys is based on four parts, wherein the first and last part are each computed based on a product of different generators of one of the groups, wherein one of the generators is computed based on the user-specific plaintext.

14. The method according to claim 13, wherein the two middle parts of the four parts are using different products of generators, wherein the generators are computed based on the user-specific plaintexts and different random information.

15. A tangible, non-transitory computer-readable medium having instructions thereon which, upon being executed by one or more processors, alone or in combination, provide for execution of the method of claim 1.

16. A system comprising one or more processors, which alone or in combination, are configured to provide for performance of a method for providing encrypted data on a client, a cloud or the like, wherein each of a plurality of users has been provided a respective user-specific encryption key for encrypting respective user-specific plaintext into respective user-specific ciphertext, the method comprising:
   storing a common decryption key that has been computed with a pre-determined function using the user-specific encryption keys as inputs for the function, the common decryption key having been computed based on at least two product groups of the same prime order,
   receiving the user-specific ciphertexts,
   computing a common ciphertext with the function using the user-specific ciphertexts as inputs for the function, wherein the common decryption key is usable to decrypt the common ciphertext, and
   providing both the common ciphertext and the common decryption key to one of the users and/or decrypting the common ciphertext with the common decryption key;
   wherein the user-specific ciphertexts are generated such that encryption is homomorphic in the user-specific plaintext as well as in the user-specific encryption keys, and
   wherein the function is a polysized function supporting poly-many additions and a single multiplication.

17. The system according to claim 16, wherein prior to computing the common decryption key, a master secret key is computed, wherein the common decryption key is based on the master secret key in addition to the user-specific encryption keys.

18. The system according to claim 16, wherein the method further comprises:
   computing a master secret key based on each of the user-specific ciphertexts, and
   computing the common decryption key such that the master secret key, in addition to the user-specific encryption keys, serves as an input to the function.

19. The system according to claim 16, wherein the common ciphertext is computed such that any key capable of decrypting the common ciphertext must be a function of each of the user-specific encryption keys that were used to generate the user-specific ciphertext upon which the common ciphertext is based.

20. A method for providing encrypted data on a client, a cloud or the like, performed in a memory available to a computation device, wherein each of a plurality of users has been provided a respective user-specific encryption key for encrypting respective user-specific plaintext into respective user-specific ciphertext, the method comprising:
   storing a common decryption key that has been computed with a pre-determined function using the user-specific encryption keys as inputs for the function,
   receiving the user-specific ciphertexts,
   computing a common ciphertext with the function using the user-specific ciphertexts as inputs for the function, wherein the common decryption key is usable to decrypt the common ciphertext, and
   providing both the common ciphertext and the common decryption key to one of the users and/or decrypting the common ciphertext with the common decryption key.

* * * * *